V. PAVLOFF & Z. ORIZAROFF.
AUTOMOBILE SAFETY SIGN.
APPLICATION FILED MAR. 9, 1916.

1,218,308.

Patented Mar. 6, 1917.
2 SHEETS—SHEET 1.

WITNESSES

INVENTORS
Variky Pavloff
Zvetko Orizaroff
BY
ATTORNEYS

V. PAVLOFF & Z. ORIZAROFF.
AUTOMOBILE SAFETY SIGN.
APPLICATION FILED MAR. 9, 1916.
1,218,308.
Patented Mar. 6, 1917.
2 SHEETS—SHEET 2.
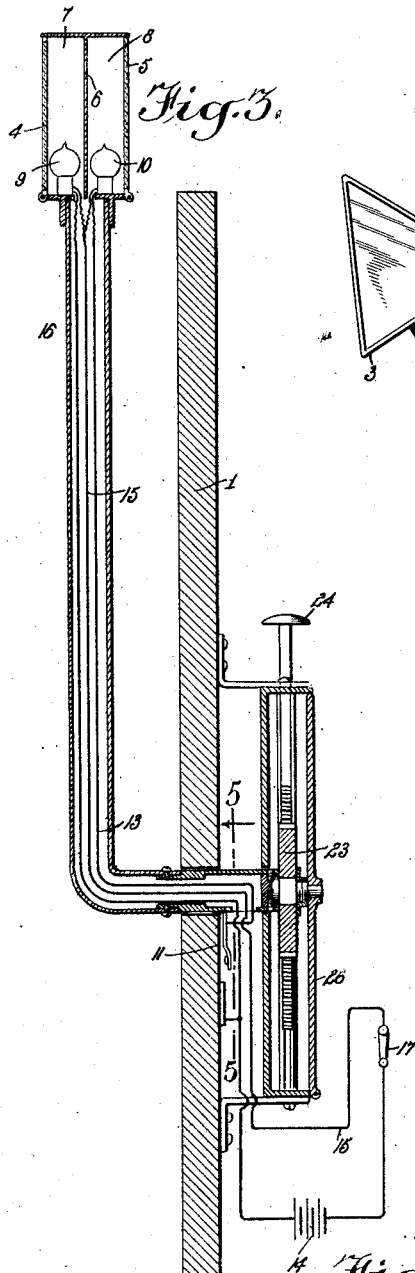
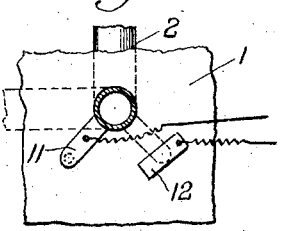
WITNESSES
INVENTORS
Varity Pavloff
Zvetko Orizaroff
BY
ATTORNEYS

UNITED STATES PATENT OFFICE.

VARIKY PAVLOFF AND ZVETKO ORIZAROFF, OF HARRISBURG, PENNSYLVANIA.

AUTOMOBILE SAFETY-SIGN.

1,218,308.  Specification of Letters Patent.  Patented Mar. 6, 1917.

Application filed March 9, 1916. Serial No. 83,134.

*To all whom it may concern:*

Be it known that we, VARIKY PAVLOFF and ZVETKO ORIZAROFF, subjects of the Czar of Bulgaria, and residents of Harrisburg, in the county of Dauphin and State of Pennsylvania, have invented a new and Improved Automobile Safety-Sign, of which the following is a full, clear, and exact description.

This invention relates to signaling devices and particularly to a signaling device adapted for vehicles, and has for an object the provision of an improved construction operable by the driver for disclosing his intentions in regard to stopping or turning, either to persons in front or in rear of the vehicle.

Another object in view is to provide a signaling device formed with an arm and a signaling sheet in connection therewith, together with foot or hand operated members for moving the arm and sheet to an open and closed position according to the intention of the driver.

A still further object in view is to provide a signaling arm having electric lamps arranged therein and manually operated means for swinging the arm, together with a curtain whereby as the arm is swung to an outer position the lights may be lighted and the curtain brought to view so as to present a large surface in daytime and a lighted member at night.

In the accompanying drawings:—

Fig. 3 is a sectional view through Fig. 2 approximately on line 3—3, the same being on an enlarged scale.

Fig. 4 is a front view of the signaling arm and associated parts, the same being shown partially moved to an operative or signaling position.

Fig. 5 is a detail fragmentary sectional view through Fig. 3 on line 5—5, showing an electric switch embodying certain features of the invention.

Figure 1:
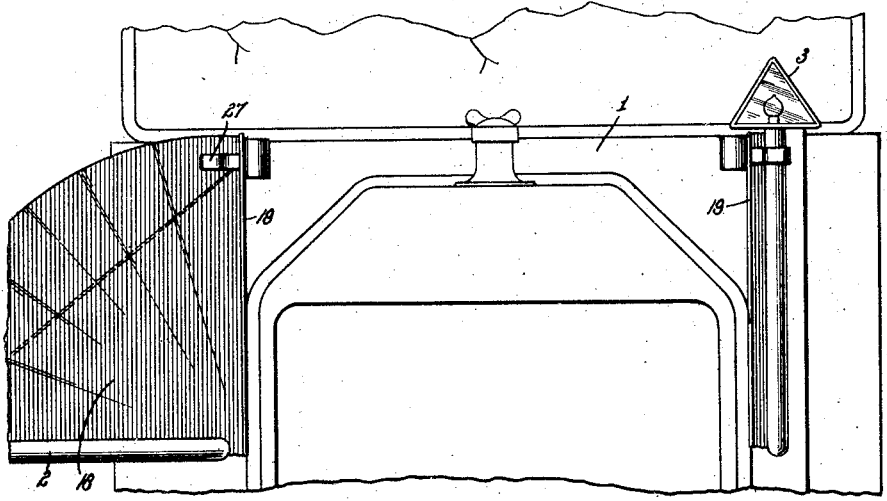
Figure 1 is a fragmentary front view of an automobile with an embodiment of the invention applied thereto, one signaling member being shown in an inoperative position and the other in an outer or operative position.
Figure 2:
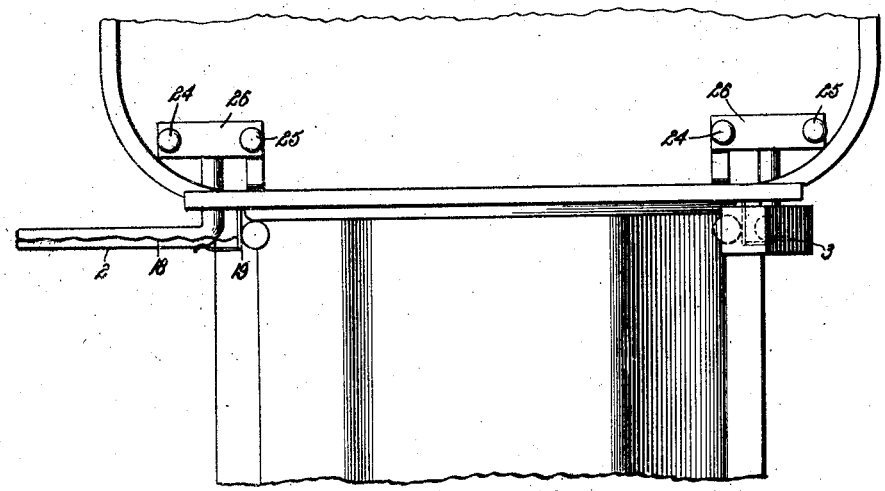
Fig. 2 is a top plan view of the structure shown in Fig. 1.

Referring to the accompanying drawings by numerals, 1 indicates an automobile of any desired kind, to which an embodiment of the invention has been applied. In arranging an embodiment of the invention on an automobile it is designed to place an independent construction on each side so that a signaling member may be swung out to one side on either side of the machine. As both of these signaling devices are identical a description of only one will be given, the parts of course being rearranged to operate in the opposite direction.

As shown more in detail in Figs. 3 and 4 the signaling device comprises a tubular member 2 pivotally mounted in the front part of the automobile or in any other way as may be desired, said tubular member carrying at its upper end a casing 3 having front and rear glasses 4 and 5, respectively, with a metallic or opaque partition 6 arranged therebetween so as to provide chambers 7 and 8. In the chamber 7 is arranged a lamp 9 while in the chamber 8 a lamp 10 is provided. The lamp 9 is designed to act as a headlight for the automobile when the device is in its inoperative upright position and act as a signal light when the arm or tubular member 2 is swung downwardly to substantially the position shown at the left in Fig. 1. At night the lamp 9 is kept continually lighted so that it may act at one time as a headlight and at the other as a signal light shining to the front. At night, when the arm 2 is swung downwardly to a signaling or operative position, light 10 will be lighted so as to present a signal facing to the rear.

As soon as the arm 2 is raised to its vertical position lamp 10 will be turned off. This is accomplished by wiring shown in Fig. 3 which includes a switch arm 11 (Fig. 5) designed to contact with a plate 12 when the arm 2 is in its lowermost position. One of the wires, namely, the return wire 13 of lamp 10, is connected with arm 11 so that when the arm or tubular member 2 is in a vertical position the arm 11 will be out of contact with plate 12, as shown in Fig. 5. A source of supply 14 is provided which supplies current to a feed wire 15, which feed wire is connected to both lamps 9 and 10. Lamp 9 is provided with a return wire 16, which return wire is connected with plate 12 and also with source of supply 14 so as to complete the circuit of lamp 9 whenever the switch 17 is closed, and to complete the circuit of lamp 10, also, whenever the switch arm 11 is engaging plate 12. During the day switch 17 is left open so that both lamps are never lighted. However, the arm 2 may be raised and lowered for presenting the signal whenever desired.

Connected with arm 2 is a curtain 18 which is adapted to fold like a folding fan so that when the parts are in their vertical position, as shown at the right in Fig. 1, the arm 2 will be in a vertical position and the curtain 18 will be snugly folded between the arm and the projecting plate 19. In order to counterbalance the weight of the arm 2 and associated parts a cable 20 is connected with the arm, as shown in Fig. 4, and is wound on the drum 21, which drum is connected with spring 22 and winds the spring when the arm is lowered. The spring will unwind as the arm is raised and will assist in raising the arm. However, in order to positively raise and lower the arm the gear wheel 22 is rigidly secured to the inner end of the arm or tubular member 2, as shown more particularly in Fig. 3, said gear wheel meshing with sliding racks 24 and 25, said sliding racks fitting in a suitable frame 26 and extending beyond the upper end thereof.

When the foot or hand of the operator is placed upon rack 24 and pressed downwardly the rack will cause the gear wheel 23 to rotate and as said gear wheel is rigidly secured to arm 2 the arm will swing downwardly to the position shown at the left in Fig. 1 and will automatically move the rack 25 upwardly. When it is desired to again raise the arm the foot of the operator is placed upon rack 25 and pressed, whereupon said rack will move downwardly and the arm 23 will swing back to its original vertical position and at the same time wheel 22 will move the rack 24 to a raised position.

The casing or frame 26 and parts associated therewith may be connected to the front of the automobile or to any suitable point on an automobile where easy access may be had by the operator. It is of course evident that a casing 26, when operating the mechanism associated therewith, is provided for each of the arms 22 so that an arm may be thrown out on either side as may be desired and a large sign produced by the curtain 18 during the day and a lighted sign may be produced both front and rear by lamps 9 and 10 at night. When the arm is returned it snaps into the clasp 27 and is held normally in an upright position thereby.

What we claim is:—

In an automatic safety sign for automobiles, a pivotally mounted arm adapted to be swung from a vertical to a horizontal position, said arm having a bent end formed of sufficient length to extend through the dashboard of the automobile, a gear wheel secured to said arm on the part extending through said dashboard, said gear wheel being arranged on the opposite side of the dashboard to the remaining part of the arm, a rack on each side of the gear wheel meshing therewith, independent guides for said racks whereby when one of said racks is pressed downwardly the arm will be swung from a vertical to a horizontal position and the opposite rack elevated, and when said opposite rack is depressed the parts will be moved in the opposite direction and counterbalancing means connected to the upper end of said arm for assisting in returning said arm from a horizontal to a vertical position.

In testimony whereof we have signed our names to this specification in the presence of two subscribing witnesses.

VARIKY PAVLOFF.
ZVETKO ORIZAROFF.

Witnesses:
H. EDWIN PARSON,
O. ZIMMERMAN.